Figure 1:
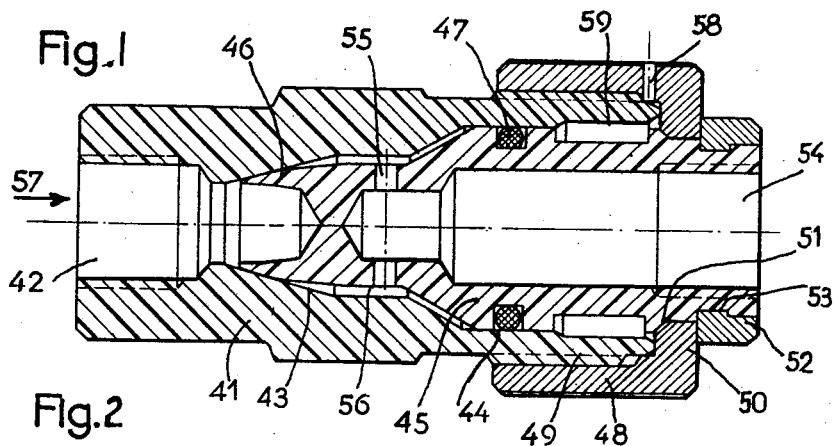

March 3, 1964     L. PÉRAS     3,123,337

PLASTIC FITTING AND VALVES

Filed May 5, 1958

Inventor
Lucien Péras
by Stevens Davis Miller & Mosher
his attorneys

United States Patent Office 3,123,337
Patented Mar. 3, 1964

2,123,337
PLASTIC FITTINGS AND VALVES
Lucien Péras, Billancourt, France, assignor to Regie Nationale des Usines Renault, Billancourt, France, a French works
Filed May 5, 1958, Ser. No. 733,065
Claims priority, application France June 26, 1957
4 Claims. (Cl. 251—333)

The present invention relates to pipe fittings and valves or cocks and is concerned more particularly with means for warranting therein a definitely reliable seal without any excessive tightening while relying on plastic elements alone, in conformity with the increasing trend towards the use of plastic hose and pipe fittings.

Thus, according to the essential feature of this invention, the fitting and valves constituting the subject matter thereof comprises a member constituting a seat for an obturator, this seat consisting of a cup-like widened portion of the fluid passage which is of substantially frustoconical configuration in the sealing zone engaged by a correspondingly shaped portion of the co-acting element of the fitting or valve under a convenient tightening force, this element being provided at its corresponding end with a sealing annular portion engageable in said cup-like widened portion and so shaped as to form a circular sealing lip of which the sealing action results both from the stressing thereof obtained by pressing same and attended by a slight deformation against said frusto-conical surface, and from the fluid pressure that may be present in the fitting or valve.

Moreover, by providing positive means for limiting the tightening of the obturator, it is possible to determine the optimum position of the sealing annular portion against and relative to the cup-like widened portion with which it co-acts.

With the arrangement broadly set forth hereinabove, the sealing action thus obtained is not subordinate to a more or less pronounced tightening effort (which may even be relatively low since a manual tightening is sufficient), so that the fitting may be disassembled or the cock actuated as many times as desired or necessary without any risk of impairing the efficiency of the joint.

Preferably, the valves, fittings or cocks constructed in accordance with the principles set forth hereinabove, or at least the element thereof which incorporates the sealing lip, are made entirely of plastic material, whereby the circular sealing lip be at the same time flexible and resistant, for it will be readily understood that a metal flange would not meet the requirements set forth hereinabove.

This disposition applied to the construction of complete plastic couplings, fittings, valves or cocks provides, in addition, considerable advantages such as an extremely accurate fabrication of the parts to the requisite dimensions, the suppression of any machining step, the elimination of any risk of corrosion by atmospheric agents, moisture, etc., a long useful life, the possibility of frequent disassembling and re-assembling without impairing the joint efficiency, an easy assembling and disassembling, the reduction of manpower cost, the suppression of packing gaskets or other intermediate elements employed in conventional fittings, very low manufacturing cost, low weight, and consequently low equipment weight.

Figure 2:
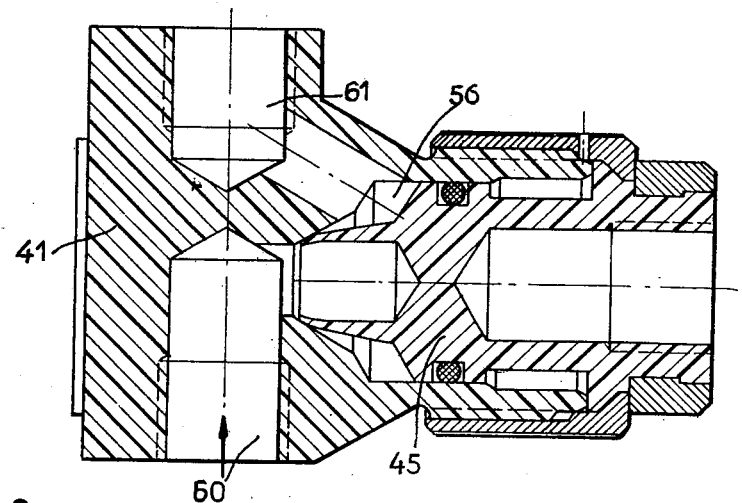
Figure 3:
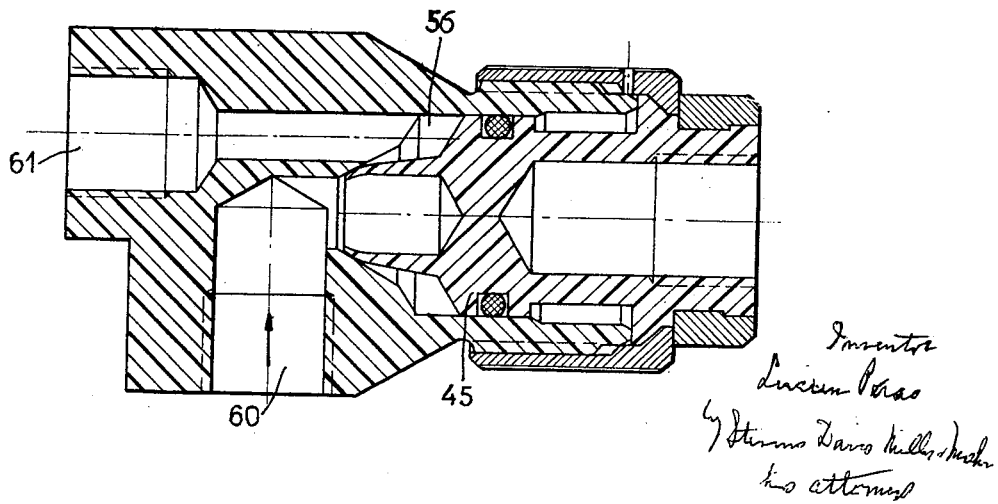

The application of the arrangements according to this invention to the design and manufacture of fittings, valves and cocks according to this invention, will now be described with reference to the attached drawings wherein a few forms of embodiment of the invention are shown by way of non-limiting example. In the drawings:

FIGURE 1 is an axial section showing a coupling valve for a flexible-hose distributing system, and FIGURES 2 and 3 are similar views showing a straight valve and an angle valve respectively for fixed-pipe distribution.

According to the principle of the invention and to the specific forms of embodiments of the cocks or valves the sealing lip may be an integral part of the plug axially movable in the valve body.

FIGURE 1 illustrates a particularly interesting embodiment in the case of a fluid distribution through a network of flexible hoses incorporating an in-line valve variable in length. The reference numeral 41 designates the cock or valve body of which the inlet orifice 42 adapted to be secured by screwing on the supply hose or union has a frustoconical extension 43. This valve body comprises notably at 44 a cylindrical bore in which the plug 45 is adapted to slide, the annular sealing lip 46 of this plug being thus adapted to engage the tapered seat 43. The plug 45 slides in a fluid-tight manner in the bore 44, a toroidal resilient gasket 47 being provided to this end.

The axial movement of this plug is obtained with the assistance of a knurled or milled knob 48 screwed on the threaded end 49 of the valve body. This knob 48 is provided for this purpose with an inner flange 50 disposed between a shoulder 51 of the plug and a nut 52 which, in this case, is fitted by resilient deformation and retained in the annular groove 53.

It is evident that on screwing the nut, the lip 46 of the plug will engage the frustoconical surface 43 and become slightly curved inwards, as shown in the figure to seal the passage under the conditions set forth hereinabove. It will be seen that any undue over-tightening of the valve-closing member in the closing direction is also avoided since the knob flange is adapted to engage the valve body when the plug is properly seated, that is when the annular lip 46 is in proper sealing engagement with the seat. Of course, as the knob and plug move bodily with each other in the axial direction, this tightening limitation may be obtained by positively stopping the plug as illustrated in FIGS. 2 and 3.

In this example concerning a junction valve or cock for flexible hose distribution (FIG. 1), the plug is advantageously formed at 54 with an orifice for fitting an outlet hose therein, this orifice communicating through lateral ports 55 with the cavity 56 provided in the valve body around the front end of the plug which extends freely therethrough.

It is also evident that when the knob 48 is unscrewed the plug recedes and that when the sealing lip 46 of this plug is no more in contact with the seat-forming frustoconical surface 43, the fluid introduced in the direction of the arrow 57 will penetrate into the cavity 56 and subsequently flow through the lateral ports 55 into the outlet pipe connected at 54.

Under these conditions, the cock is variable in length between its inlet and outlet connections, which is permissible provided that at least the hose connected at 54 is flexible. Besides, a radial orifice 58 is formed through the wall of the knob 48 so that the presence of fluid in the pipe system may be detected before unscrewing the knob 48 completely, as the sliding portion of the plug leaves the bore 44 before registering with the widened portion 59 of the valve body.

Of course, this form of embodiment may also constitute an end cock or valve, and the inlet connecting orifice 57 may also be positioned at right angles to the outlet orifice.

FIGURE 2 is an axial section illustrating a device of similar design which is suitable for mounting a cock or valve between aligned fixed pipes.

The valve body 41 comprises in this case an inlet orifice 60 and an outlet orifice 61, the latter communicating permanently with the space 56 surrounding the front portion of plug 45, the sealing function and operation of this plug being those already described in connection with the embodiment of FIG. 1.

In other installations it may be advantageous to use an angle valve between fixed pipes, in order to avoid the use of an angle fitting, and FIG. 3 illustrates an embodiment of this character which comprises inlet and outlet orifices 60, 61 respectively.

Anybody conversant with the art will be readily aware that a valve or cock constructed according to this invention will combine the properties defined hereinabove with the appreciable advantage that it is extremely cheap to manufacture on a commercial scale.

I claim:

1. A fitting comprising a first coupling member having a tubular end formed from plastic material and having a widened cup-shaped inner portion forming a frusto-conical seat surface, a second coupling member having a plastic annular end portion fitting in the tubular end of the first coupling member and terminating in a bevelled annular lip freely engageable inside the seat surface, said lip having a free end axially abutting against an intermediate portion of the seat surface, tightening means for coupling said members and simultaneously subjecting the lip to an elastic flexion with the end of said lip being constricted in a sealing relationship against the seat surface, wherein a valve body having an inlet orifice constitutes the first member and is provided with the cup-shaped seat-forming frusto-conical surface, the second member constituting a plug fitting in a fluid-tight manner and slidably in a bore constituting the central chamber of the valve body, said tightening means including a knob screwed on the valve body so as to actuate said plug, and means rendering said knob and plug axially solid with each other.

2. A fitting according to claim 1, wherein means are provided for limiting the tightening of the plug to the optimum position of the annular sealing lip end relative to the seat surface when closing the valve, said knob and plug abutting against the valve body in this optimum position.

3. A fitting according to claim 1, wherein said plug is provided with an axial passage communicating with a chamber formed in the valve body between the bore in which the plug slides in fluid-tight fashion and the sealing surface engaged by the annular lip on said seat, said axial passage constituting the outlet passage of the valve.

4. A fitting according to claim 1, wherein means is provided for checking the presence and pressure of fluid in the valve, said means consisting of an orifice formed radially through the wall of the knob, said orifice communicating with the central chamber of the valve when the knob is partially unscrewed from the valve body and the plug has been backed out from the bore.

References Cited in the file of this patent

UNITED STATES PATENTS

| | | |
|---|---|---|
| 1,423,418 | Grikscheit | July 18, 1922 |
| 1,900,902 | Barks | Mar. 14, 1933 |
| 2,330,864 | Bruno | Oct. 5, 1943 |
| 2,785,910 | Munger | Mar. 19, 1957 |
| 2,823,699 | Willis | Feb. 18, 1958 |
| 2,865,596 | Monnig | Dec. 23, 1958 |
| 2,985,180 | Grayson | May 23, 1961 |

FOREIGN PATENTS

| | | |
|---|---|---|
| 356,882 | Great Britain | Sept. 17, 1931 |
| 1,059,317 | France | Nov. 10, 1953 |
| 1,143,461 | France | Apr. 15, 1957 |